United States Patent
Choi et al.

(10) Patent No.: US 10,859,823 B1
(45) Date of Patent: Dec. 8, 2020

(54) HEAD-MOUNTED DISPLAY DEVICE WITH SELECTIVE GAMMA BAND FOR HIGH CONTRAST RATIO

(71) Applicant: Facebook Technologies, LLC, Menlo Park, CA (US)

(72) Inventors: Jacob Choi, Menlo Park, CA (US); Cheonhong Kim, Menlo Park, CA (US)

(73) Assignee: FACEBOOK TECHNOLOGIES, LLC, Menlo Park, CA (US)

( * ) Notice: Subject to any disclaimer, the term of this patent is extended or adjusted under 35 U.S.C. 154(b) by 0 days.

(21) Appl. No.: 16/200,300

(22) Filed: Nov. 26, 2018

(51) Int. Cl.
*G02B 27/01* (2006.01)

(52) U.S. Cl.
CPC ..... *G02B 27/0101* (2013.01); *G02B 27/0172* (2013.01); *G02B 2027/0118* (2013.01); *G09G 2320/066* (2013.01); *G09G 2320/0673* (2013.01)

(58) Field of Classification Search
CPC ............ G02B 27/0101; G02B 27/0172; G02B 2027/0118; G09G 2320/066; G09G 2320/0673
See application file for complete search history.

(56) References Cited

U.S. PATENT DOCUMENTS

| | | | |
|---|---|---|---|
| 9,905,168 B1* | 2/2018 | Richards | G09G 3/3406 |
| 10,018,838 B2* | 7/2018 | Richards | G09G 5/00 |
| 2014/0022271 A1* | 1/2014 | Lin | G09G 3/36 |
| | | | 345/589 |
| 2016/0063919 A1* | 3/2016 | Ha | G02B 27/017 |
| | | | 345/156 |
| 2018/0173060 A1* | 6/2018 | Guo | G09G 3/3611 |
| 2019/0172419 A1* | 6/2019 | Hwang | G09G 5/10 |

* cited by examiner

*Primary Examiner* — Afroza Chowdhury
(74) *Attorney, Agent, or Firm* — Morgan, Lewis & Bockius LLP

(57) ABSTRACT

A virtual-reality device includes a data generator, one or more processors, two or more gamma bands, and a display. The virtual-reality device generates initial color values for each of the plurality of pixels, and determines a respective gray-level value for each of the pixels according to the generated color values. The device selects, for each of the pixels, a respective gamma band corresponding to the determined respective gray-level value and one or more respective contextual markers, where each gamma band has a distinct luminance target. The virtual-reality device then adjusts the luminance level of each pixel according to the respective selected gamma band and displays the pixels according to the adjusted luminance levels.

18 Claims, 6 Drawing Sheets

HEAD-MOUNTED DISPLAY DEVICE WITH SELECTIVE GAMMA BAND FOR HIGH CONTRAST RATIO

TECHNICAL FIELD

The present disclosure relates generally to head-mounted displays, and more specifically to improving the contrast ratio of display screens for head-mounted virtual-reality display devices.

BACKGROUND

A head mounted display (HMD) can be used for immersive virtual-reality games, videos, and other media content. For example, stereoscopic images are displayed on a display inside the HMD to simulate the illusion of depth, and head tracking sensors estimate what portion of the virtual environment is being viewed by the user. However, users of the HMD view the display screen at a close range and may be able to see spaces between pixels of the display (referred to as the "screen-door" effect), which may cause visual fatigue, irritation, and distraction for users.

SUMMARY

One solution to the problem includes providing a head-mounted display device that uses selective gamma correction to improve the display contrast ratio. By increasing the number of available gamma bands, multiple luminance values can be achieved to improve the contrast ratio for specific portions of the display. The display includes multiple gamma bands to achieve a lower or higher display brightness value (DBV). Controlling the pixel luminance allows dark areas to look darker and light areas to look lighter to mitigate the a low contrast ratio.

In accordance with some embodiments, a method is performed at a virtual-reality device having a data generator, one or more processors, two or more gamma bands, and a display having a plurality of pixels. The method generates initial color values for each of the plurality of pixels. The method further determines a respective gray-level value for each of the pixels according to the generated color values. The method further selects, for each of the pixels, an appropriate gamma band corresponding to the determined gray-level value and one or more contextual markers, where each gamma band has a distinct luminance level. The method then adjusts the luminance level of each pixel according to the respective selected gamma band and displays the pixels according to the adjusted luminance levels.

In accordance with some embodiments, a head-mounted display device includes one or more processors/cores and memory storing one or more programs configured to be executed by the one or more processors/cores. The one or more programs include instructions for performing the operations of any of the methods described herein. In accordance with some embodiments, a non-transitory computer-readable storage medium stores instructions that, when executed by one or more processors/cores of a head-mounted display device, cause the device to perform the operations of any of the methods described herein.

BRIEF DESCRIPTION OF DRAWINGS

For a better understanding of the various described embodiments, reference should be made to the Description of Embodiments below, in conjunction with the following drawings in which like reference numerals refer to corresponding parts throughout the figures and specification.

Figure 1:
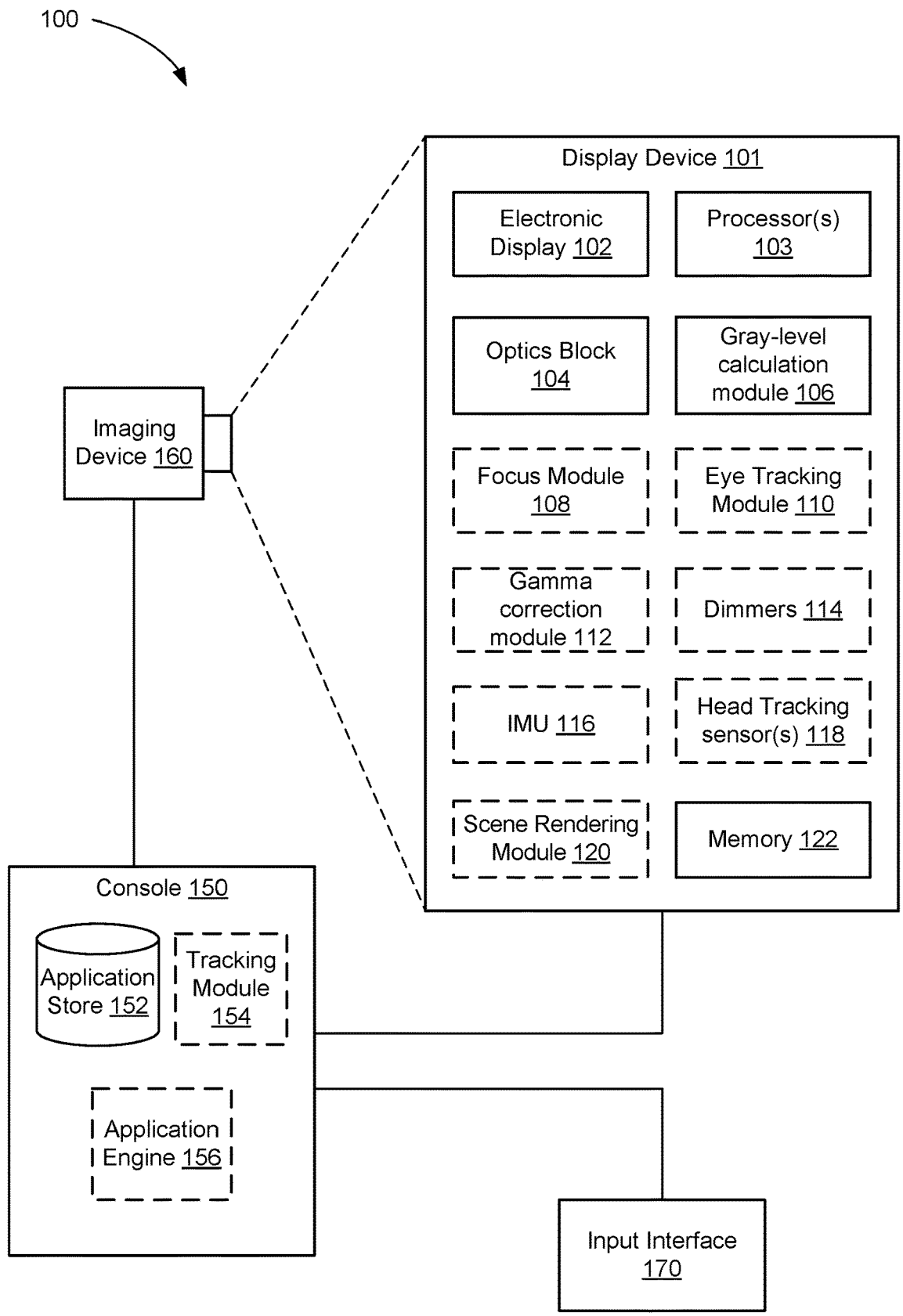
FIG. 1 is a block diagram illustrating an example system in accordance with some embodiments.

The figures depict embodiments of the present disclosure for purposes of illustration only. One skilled in the art will readily recognize from the following description that alternative embodiments of the structures and methods illustrated herein may be employed without departing from the principles of the disclosure described herein.

DESCRIPTION OF EMBODIMENTS

Reference will now be made to embodiments, examples of which are illustrated in the accompanying drawings. In the following description, numerous specific details are set forth in order to provide an understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first and second are used herein to describe various elements, these elements should not be limited by these terms. These terms are used only to distinguish one element from another. For example, a first motor could be termed a second motor, and, similarly, a second motor could be termed a first motor, without departing from the scope of the various described embodiments. The first motor and the second motor are both motors, but they are not the same motor, unless specified otherwise.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, steps, operations, elements, and/or components, but do not preclude the presence or addition of one or more other features, steps, operations, elements, components, and/or groups thereof.

As used herein, the term "if" means "when" or "upon" or "in response to determining" or "in response to detecting" or "in accordance with a determination that," depending on the context. Similarly, the phrase "if it is determined" or "if [a stated condition or event] is detected" means "upon determining" or "in response to determining" or "upon detecting [the stated condition or event]" or "in response to detecting [the stated condition or event]" or "in accordance with a determination that [a stated condition or event] is detected," depending on the context.

As used herein, the term "exemplary" is used in the sense of "serving as an example, instance, or illustration" and not in the sense of "representing the best of its kind."

FIG. 1 is a block diagram illustrating a system 100 in accordance with some embodiments. The system 100 shown in FIG. 1 includes a display device 101, an imaging device 160, and an input interface 170. In some embodiments, all of the display device 101, the imaging device 160, and the input interface 170 are coupled to a console 150.

Embodiments of the system 100 may include or be implemented in conjunction with an artificial reality system. Artificial reality is a form of reality that has been adjusted in some manner before presentation to a user, which may include, for example, virtual reality (VR), augmented reality (AR), mixed reality (MR), hybrid reality, or some combination and/or derivatives thereof. Artificial reality content may include completely generated content or generated content combined with captured (e.g., real-world) content. The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may also be associated with applications, products, accessories, services, or some combination thereof. They are used, for example, to create content in an artificial reality environment and/or are otherwise used in (e.g., to perform activities in) artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

While FIG. 1 shows a single display device 101, a single imaging device 160, and a single input interface 170, in some other embodiments, any number of these components may be included in the system. For example, there may be multiple display devices, each having an associated input interface 170 and being monitored by one or more imaging devices 160, with each display device 101, input interface 170, and imaging device 160 communicating with the console 150. In alternative configurations, different and/or additional components may also be included in the system.

In some embodiments, the display device 101 is a head-mounted display that presents media to a user of the display device 101. The display device 101 is also referred to as a head-mounted display device. Examples of media presented by the display device 101 include one or more images, video, audio, or some combination thereof. In some embodiments, audio is presented via an external device (e.g., speakers and/or headphones) that receives audio information from the display device 101, the console 150, or both, and presents audio data based on the audio information. In some embodiments, the display device 101 immerses a user in a virtual environment.

In some embodiments, the display device 101 also acts as an augmented reality (AR) headset. In these embodiments, the display device 101 augments views of a physical, real-world environment with computer-generated elements (e.g., images, video, or sound). Moreover, in some embodiments, the display device 101 is able to cycle between different types of operation. Thus, the display device 101 operates as a virtual reality (VR) device, an AR device, as glasses, or some combination thereof (e.g., glasses with no optical correction, glasses optically corrected for the user, sunglasses, or some combination thereof) based on instructions from an application engine 156.

In some embodiments, the display device 101 includes one or more of each of the following: an electronic display 102 (e.g., a liquid crystal display (LCD)), a processor 103, an optics block 104, a gray-level calculation module 106, a focus prediction module 108, an eye tracking module 110, a gamma correction module 112, one or more dimmers 114, an inertial measurement unit 116, one or more head tracking sensors 118, a scene rendering module 120, and memory 122. In some embodiments, the display device 101 includes only a subset of the modules described here. In some embodiments, the display device 101 has different modules than those described here. Similarly, the functions can be distributed among the modules in a different manner than is described here.

One or more processors 103 (e.g., processing units or cores) execute instructions stored in the memory 122. The memory 122 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. The memory 122, or alternatively the non-volatile memory devices within the memory 122, includes a non-transitory computer readable storage medium. In some embodiments, the memory 122 or the computer readable storage medium of the memory 122 stores programs, modules, and data structures, and/or instructions for displaying one or more images on the display 102.

The display 102 displays images to the user in accordance with data received from the console 150 and/or the processor(s) 103. In various embodiments, the display 102 comprises a single adjustable display element or multiple adjustable displays elements (e.g., a display for each eye of a user). The display module 102 may include one or more display driver integrated circuits (DDICs).

The optics block 104 directs light from the display 102 to an exit pupil, for viewing by a user, using one or more optical elements, such as Fresnel lenses, convex lenses, concave lenses, filters, and so forth, and may include combinations of different optical elements. The optics block 104 typically includes one or more lenses. In some embodiments, when the display 102 includes multiple adjustable display elements, the optics block 104 includes multiple optics blocks 104 (one for each adjustable display element).

The gray-level calculation module 106 is configured to calculate a pixel's specific gray level. In some embodiments, the gray-level for a pixel is calculated according to the equation: Gray level=0.299*R+0.587*G+0.114*B, where R is the red component value, G is the green component value, and B is the blue component value within each pixel.

The optional focus prediction module 108 includes logic that tracks the position or state of the optics block 104 and/or the display 102 to predict one or more future states or locations of the optics block 104 and/or the display 102. In some embodiments, the focus prediction module 108 accumulates historical information corresponding to previous states of the optics block 104 and predicts a future state of the optics block 104 based on the previous states. Rendering of a virtual scene by the display device 101 is adjusted, at least in some embodiments, based on the state of the optics block 104. The predicted state allows the scene rendering module 120 to determine an adjustment to apply to the virtual scene for a particular frame.

The optional eye tracking module 110 tracks an eye position and/or eye movement of a user of the display device 101. In some embodiments, a camera or other optical sensor (typically located inside the display device 101) captures image information of a user's eyes, and the eye tracking module 110 uses the captured information to determine interpupillary distance, interocular distance, a three-dimensional (3D) position of each eye relative to the display device 101 (e.g., for distortion adjustment purposes), including a magnitude of torsion and rotation (i.e., roll, pitch, and yaw), and gaze directions for each eye. Many methods for tracking the eyes of a user can be used by the eye tracking module 110. Accordingly, the eye tracking module 110 may track up to six degrees of freedom of each eye (e.g., three-dimensional position, roll, pitch, and yaw) and at least a subset of the tracked quantities may be combined from the two eyes of a user to estimate a gaze point (e.g., a three-dimensional location or position in the virtual scene where the user is looking).

The gamma correction module 112 determines a gamma correction value and may determine a particular gamma band for each of the image pixels.

The optional dimmers 114 are lights located in specific positions on the display device 101, which are configured to illuminate specific portions of the display device 101. The dimmers 114 may be light emitting diodes (LED), corner cube reflectors, reflective markers, light sources that contrast with the environment in which the display device 101 operates, or some combination thereof. In some embodiments, the dimmers 114 include active locators (e.g., an LED or other type of light emitting device) configured to emit light in the visible band (e.g., about 400 nm to 750 nm), in the infrared (IR) band (e.g., about 750 nm to 1 mm), in the ultraviolet band (e.g., about 100 nm to 400 nm), some other portion of the electromagnetic spectrum, or some combination thereof.

In some embodiments, the dimmers 114 are located beneath an outer surface of the display device 101, which is transparent to the wavelengths of light emitted or reflected by the dimmers 114 or is thin enough to not substantially attenuate the wavelengths of light emitted or reflected by the dimmers 114. Additionally, in some embodiments, the outer surface or other portions of the display device 101 are opaque in the visible band of wavelengths of light. Thus, the dimmers 114 may emit light in the IR band under an outer surface that is transparent in the IR band but opaque in the visible band.

The optional inertial measurement unit (IMU) 116 is an electronic device that generates first calibration data based on measurement signals received from one or more head tracking sensors 118. The head tracking sensors 118 generate one or more measurement signals in response to motion of the display device 101. Examples of head tracking sensors 118 include accelerometers, gyroscopes, magnetometers, and other sensors suitable for detecting motion or correcting errors associated with the IMU 116. The head tracking sensors 118 may be located external to the IMU 116, internal to the IMU 116, or some combination thereof.

Based on the measurement signals from the head tracking sensors 118, the IMU 116 generates first calibration data indicating an estimated position of the display device 101 relative to an initial position of the display device 101. For example, the head tracking sensors 118 include multiple accelerometers to measure translational motion (forward/back, up/down, left/right) and multiple gyroscopes to measure rotational motion (e.g., pitch, yaw, and roll). The IMU 116 can, for example, rapidly sample the measurement signals and calculate the estimated position of the display device 101 from the sampled data. For example, the IMU 116 integrates the measurement signals received from the accelerometers over time to estimate a velocity vector and integrates the velocity vector over time to determine an estimated position of a reference point 200 on the display device 101. Alternatively, the IMU 116 provides the sampled measurement signals to the console 150, which determines the first calibration data. The reference point 200 is a point that may be used to describe the position of the display device 101. While the reference point 200 may generally be defined as a point in space, in practice the reference point 200 is defined as a point within the display device 101 (e.g., the center of the IMU 116).

In some embodiments, the IMU 116 receives one or more calibration parameters from the console 150. As further discussed below, the one or more calibration parameters are used to maintain tracking of the display device 101. Based on a received calibration parameter, the IMU 116 may adjust one or more IMU parameters (e.g., sample rate). In some embodiments, certain calibration parameters cause the IMU 116 to update an initial position of the reference point 200 so that it corresponds to a next calibrated position of the reference point 200. Updating the initial position of the reference point 200 as the next calibrated position of the reference point 200 helps reduce accumulated error associated with the determined estimated position. The accumulated error, also referred to as drift error, causes the estimated position of the reference point 200 to "drift" away from the actual position of the reference point 200 over time.

The optional scene rendering module 120 receives content for the virtual scene from the application engine 156 and provides the content for display on the display 102. Additionally, the scene rendering module 120 can adjust the content based on information from the focus prediction module 108, the IMU 116, and/or the head tracking sensors 118. For example, upon receiving the content from the engine 156, the scene rendering module 120 adjusts the content based on the predicted state (e.g., a state that corresponds to a particular eye position) of the optics block 104 received from the focus prediction module 108 by adding a correction or pre-distortion into the rendering of the virtual scene to compensate or correct for the distortion caused by the predicted state of the optics block 104. The scene rendering module 120 may also add depth of field blur based on the user's gaze, vergence depth (or accommodation depth), or measured properties of the user's eye (e.g., the three-dimensional position of the eye). Additionally, the scene rendering module 120 determines a portion of the content to be displayed on the display 102 based on one or more of the tracking module 154, the head tracking sensors 118, or the IMU 116.

The imaging device 160 generates second calibration data in accordance with calibration parameters received from the console 150. In some embodiments, the imaging device 160 includes one or more cameras, one or more video cameras, other devices capable of capturing images including the one or more locators 124, or some combination thereof. Additionally, the imaging device 160 may include one or more filters (e.g., for increasing signal to noise ratio). The imaging device 160 is configured to detect light emitted or reflected from the dimmers 114 in a field of view of the imaging device 160. In embodiments where the dimmers 114 include passive elements (e.g., a retroreflector), the imaging device 160 may include a light source that illuminates some or all of the dimmers 114, which retro-reflect the light towards the light source in the imaging device 160. The second calibration data is communicated from the imaging device 160 to the console 150, and the imaging device 160 receives one or more calibration parameters from the console 150 to adjust one or more imaging parameters (e.g., focal length, focus, frame rate, ISO, sensor temperature, shutter speed, or aperture).

The input interface 170 is a device that allows a user to send action requests to the console 150. An action request is a request to perform a particular action. For example, an action request may be to start or end an application or to perform a particular action within the application. The input interface 170 may include one or more input devices. Example input devices include a keyboard, a mouse, a game controller, or any other suitable device for receiving action requests and communicating the received action requests to the console 150. An action request received by the input interface 170 is communicated to the console 150, which performs an action corresponding to the action request. In some embodiments, the input interface 170 may provide haptic feedback to the user in accordance with instructions received from the console 150. For example, haptic feedback is provided by the input interface 170 when an action request is received, or the console 150 communicates instructions to the input interface 170 causing the input interface 170 to generate haptic feedback when the console 150 performs an action.

The console 150 provides media to the display device 101 for presentation to the user in accordance with information received from the imaging device 160, the display device 101, and/or the input interface 170. In the example shown in FIG. 1, the console 150 includes an application store 152, a tracking module 154, and an engine 156. Some embodiments of the console 150 have different or additional modules than those described in conjunction with FIG. 1. Similarly, the functions further described below may be distributed among components of the console 150 in a different manner than is described here.

When an application store 152 is included in the console 150, the application store 152 stores one or more applications for execution by the console 150. An application is a group of instructions, that, when executed by a processor 103 generates content for presentation to the user. Content generated by the processor based on an application may be in response to inputs received from the user via movement of the display device 101 or from the input interface 170. Examples of applications include gaming applications, conferencing applications, and video playback applications.

When the tracking module 154 is included in the console 150, the tracking module 154 calibrates the system 100 using one or more calibration parameters and may adjust one or more calibration parameters to reduce error in the determination of the position of the display device 101. For example, the tracking module 154 adjusts the focus of the imaging device 160 to obtain a more accurate position for observed the locators 124 on the display device 101. Moreover, calibration performed by the tracking module 154 also accounts for information received from the IMU 116. Additionally, if tracking of the display device 101 is lost (e.g., the imaging device 160 loses line of sight of at least a threshold number of the locators 124 on the display device 101), the tracking module 154 re-calibrates some or all of the system components.

In some embodiments, the tracking module 154 tracks the movement of the display device 101 using calibration data from the imaging device 160. For example, the tracking module 154 determines positions of a reference point 200 on the display device 101 using observed locators from the calibration data from the imaging device 160 and a model of the display device 101. In some embodiments, the tracking module 154 also determines positions of the reference point 200 on the display device 101 using position information from the calibration data from the IMU 116 on the display device 101. Additionally, in some embodiments, the tracking module 154 uses portions of the first calibration data, the second calibration data, or some combination thereof, to predict a future location of the display device 101. The tracking module 154 provides the estimated or predicted future position of the display device 101 to the application engine 156.

The application engine 156 executes applications within the system 100 and receives position information, acceleration information, velocity information, predicted future positions, or some combination thereof for the display device 101 from the tracking module 154. Based on the received information, the application engine 156 determines what content to provide to the display device 101 for presentation to the user, such as a virtual scene. For example, if the received information indicates that the user has looked to the left, the application engine 156 generates content for the display device 101 that mirrors or tracks the user's movement in the virtual environment. Additionally, the application engine 156 performs an action within an application executing on the console 150 in response to an action request received from the input interface 170 and provides feedback to the user that the action was performed. The provided feedback may be visual or audible feedback via the display device 101 or haptic feedback via the input interface 170.

Figure 2:
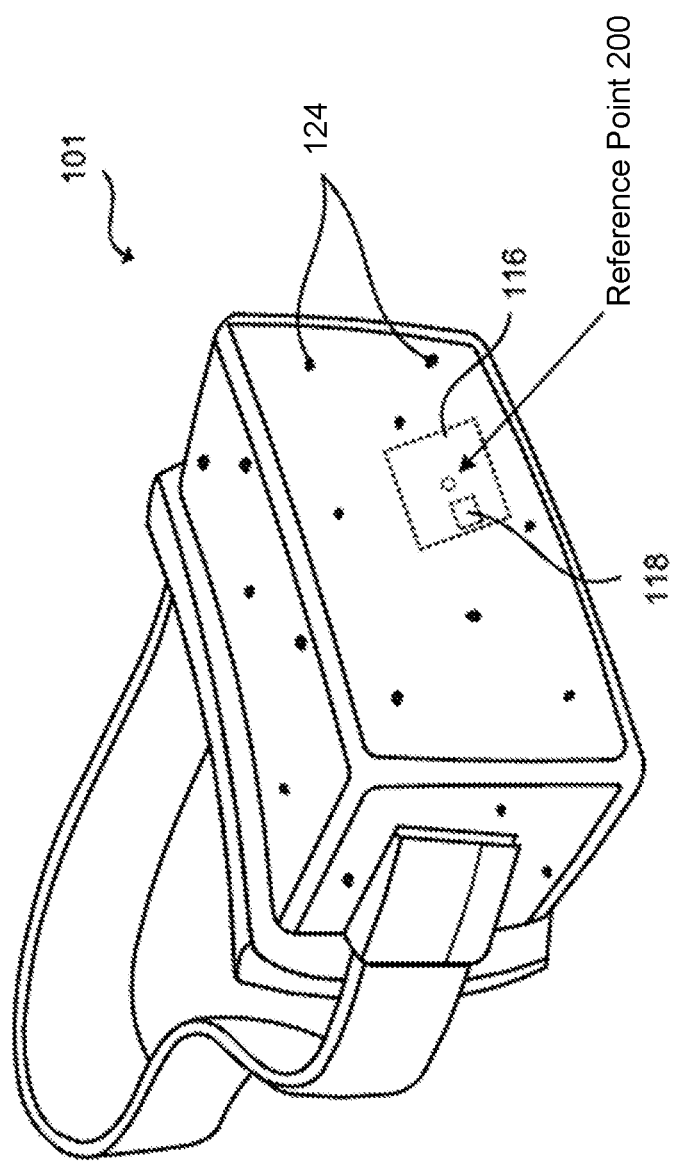
FIG. 2 illustrates a head-mounted display device in accordance with some embodiments.

FIG. 2 illustrates a head-mounted display device 101 in accordance with some embodiments. In this example, the display device 101 includes a front rigid body and a band that goes around a user's head. The front rigid body includes one or more display elements corresponding to the display 102, the IMU 116, the head tracking sensors 118, and the locators 124. In this example, the head tracking sensors 118 are located within the IMU 116. In some embodiments where the display device 101 is used in AR and/or MR applications, portions of the display device 101 may be at least partially transparent (e.g., an internal display or one or more sides of the display device 101). In some embodiments, a locator 124 is a dimmer 114.

As discussed above, the system 100 may dynamically update the luminance values according to the calculated gray values of individual pixels to improve the contrast ratio of the display device 101.

Accordingly, an initial gray-level value of each pixel of the display device 101 is determined by the gray-level calculation module 106. Pixels corresponding to a portion of a virtual scene presented by the display device 101 are optimized by the gamma band correction module 112 to improve the overall contrast of the virtual scene. After determining the initial gray-level values of the pixels, the system 100 may determine adjustments according to the assigned gamma bands. The system 100 may then display the updated pixels on the display device 101.

Figure 3:
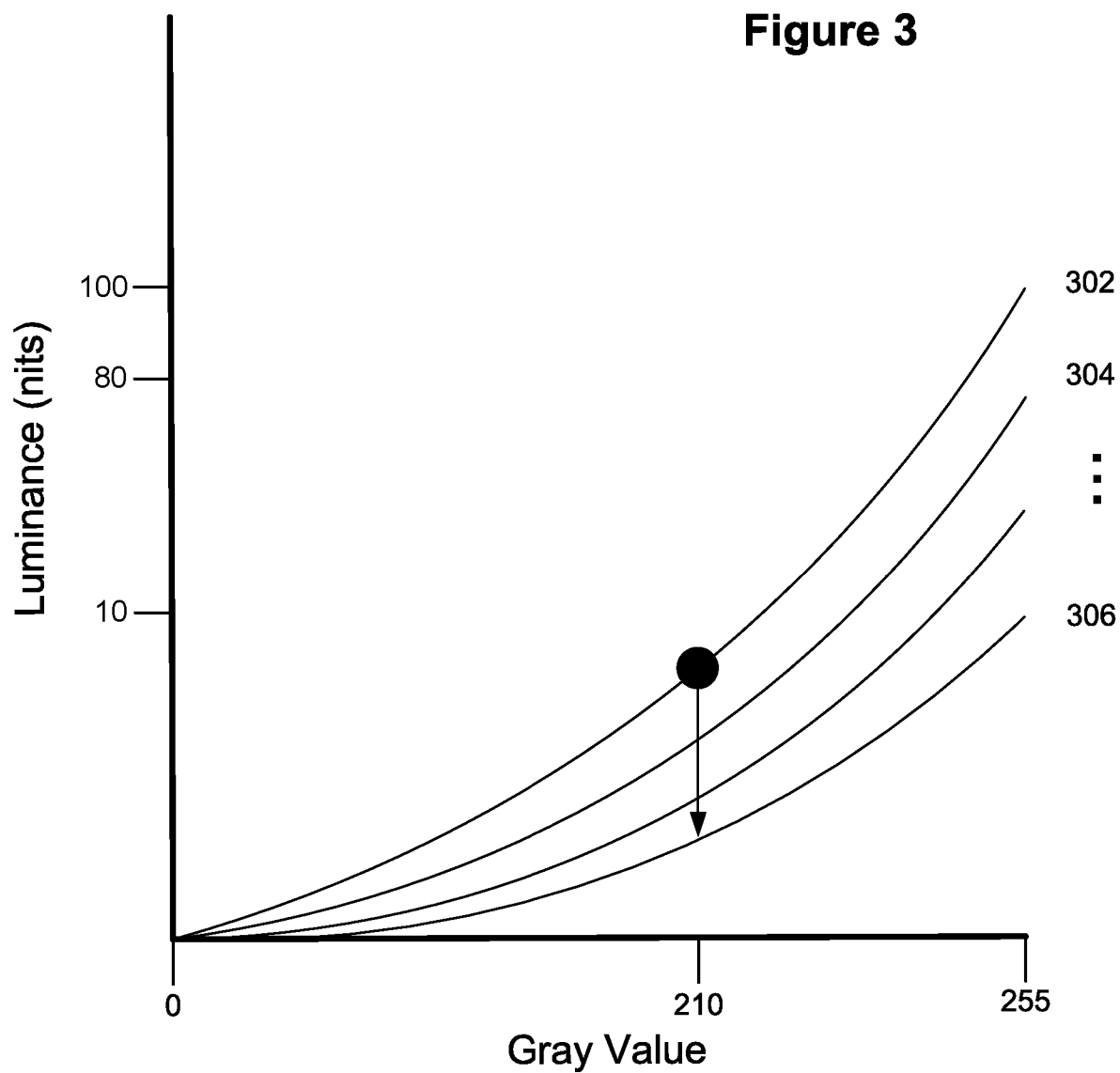
FIG. 3 is a graph illustrating the relationship between gray levels and luminance for multiple gamma bands in accordance with some embodiments.
Figure 4:
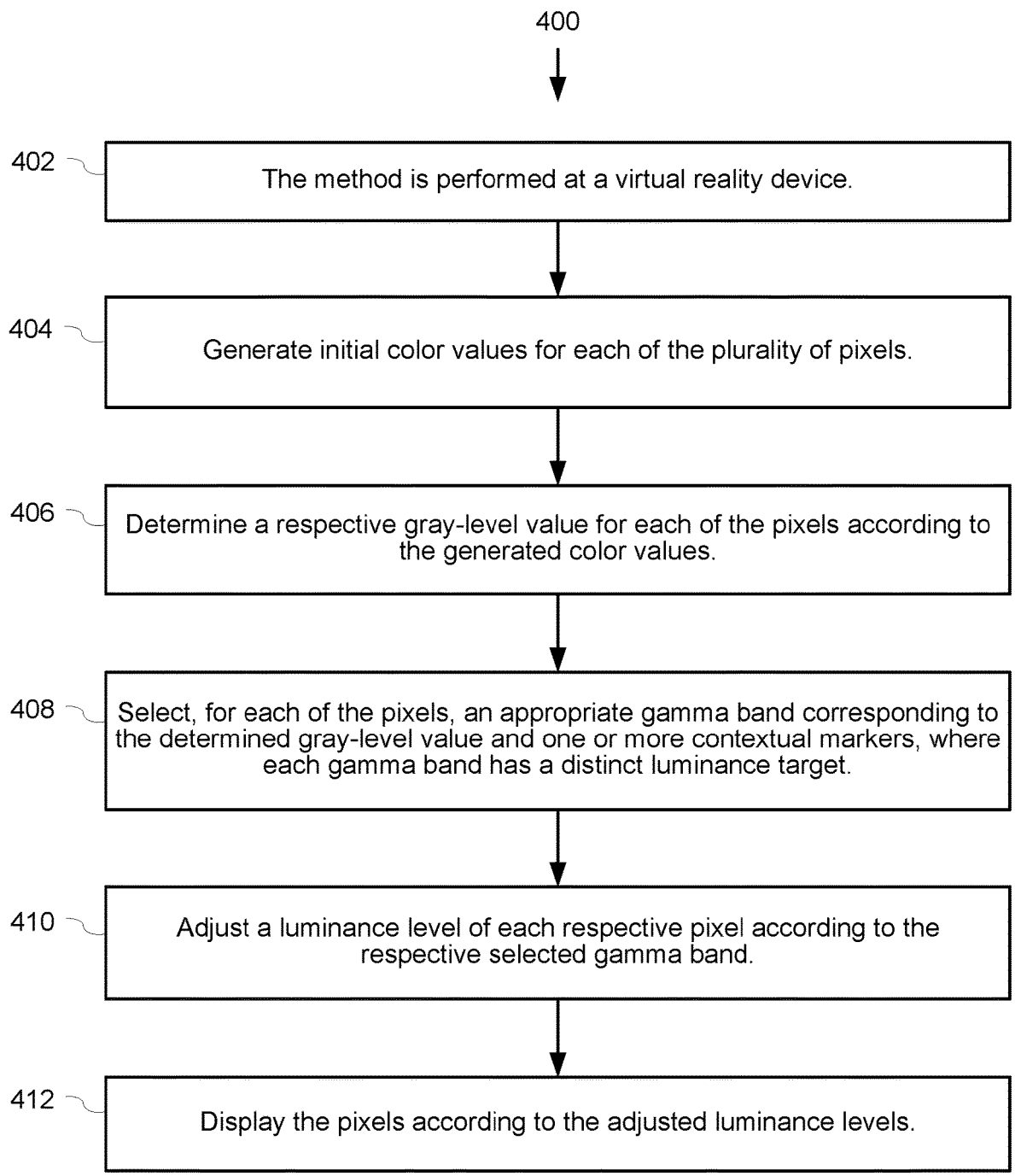
FIG. 4 is a flow diagram of a method for configuring gamma bands to produce a high contrast ratio in an electronic display in accordance with some embodiments.

FIG. 3 is a graph of multiple gamma bands. Gamma correction is typically used to improve the contrast ratio, making dark pixels look darker and light pixels look lighter. Gamma correction adjusts the brightness (e.g., luminance)

of each pixel to an appropriate luminance level for viewing. Typically, electronic devices such as computer monitors have one predetermined gamma band with a preset correction value of 1.8 or 2.2. Higher gamma values result in lighter colored pixels and lower gamma values result in darker colored pixels. If the original luminance is L, the corrected luminance is $L'=L^\gamma$, where $\gamma$ is the gamma value for the band.

In many instances, virtual reality systems aim to present users with a virtual environment that closely simulates a real world environment, causing the users to get immersed in the environment presented by the virtual reality systems. To provide users with a realistic or captivating virtual environment, a virtual reality system implements multiple systems and methods to operate together so that they are imperceptible to a user. For example, the "screen door effect" describes the situation where the user can see the space between the pixels and sees the stereoscopic image on the display as if seeing through a "screen door." This detracts from a user's experience with virtual reality systems, reducing the quality of the immersive experience.

The system 100 includes two or more gamma bands, such as gamma bands 302, 304, . . . , 306 in FIG. 3. Each gamma band has a specific gamma value and a specific luminance target. The luminance target is an optimized luminance value based on the improvements made using the contrast ratio optimization method. There is a one-to-one correspondence between gamma bands and luminance targets. For each pixel, the luminance L and gray level g are related by the formula $L=a \cdot g^\gamma$, where $\gamma$ is the gamma value and a is a constant of proportionality. Therefore, for a gamma band with gamma value $\gamma$, the luminance target is $a \cdot 255^\gamma$, because 255 is the maximum gray level.

As shown in FIG. 3, an exemplary pixel having a gray value of 210 may use gamma band 302 with a target luminance of 100 nits, or another gamma band, such as gamma band 304 or 306 having luminance targets of 80 and 10 nits, respectively. The system 100 selects among multiple gamma bands to determine at which luminance to display the pixel (e.g., to create contrast with nearby pixels).

The method 400 is a process that is performed (402) at a virtual reality device 100. The system 100 generates (404) initial color values for each of the plurality of pixels. In some embodiments, the initial color values include an RGB value between 0 and 255 for each of the colors. The system 100 determines (406) a respective gray-level value (e.g., using the gray-level calculation module 106) for each of the pixels according to the generated color values. For example, a particular pixel with an RGB value of (46, 79, 240) is calculated to have a specific gray-level value. In some instances, the equation discussed above is used to calculate the gray-level value. In this example, the particular pixel will have a gray-level value of 87.5.

The system selects (408), for each of the pixels, an appropriate gamma band corresponding to the determined gray-level value and one or more contextual markers, where each gamma band has (408) a distinct luminance target.

Contextual markers may include environmental conditions received from ambient light sensors, the inertial measurement unit 116, or other environmental factors. The contextual markers may also include information about the region of pixels that surround the given pixel.

Continuing the example from FIG. 3, a pixel with a gray-level value of 87.5 may require a lower luminance target. A gamma band with a lower luminance level such as gamma band 306 may be selected instead of a gamma band with a higher luminance level such as gamma band 302.

In some embodiments, the system 100 selects the appropriate gamma bands (e.g., via the gamma correction module 112) in accordance with a determination of a location of the pixel within the display. For example, if a pixel is located in the corner of the display, away from the immediate and direct line of vision, the system may choose not to correct the luminance of this pixel because the user will likely not notice or require high contrast. In another example, if a pixel is located directly in the line of vision of a user, the system 100 may choose to select a gamma band with a higher luminance value for a white/lighter colored pixel whereas the system 100 may choose to select a gamma band with the lowest luminance value for a black/darker colored pixel to create the most contrast.

In some embodiments, the system 100 selects the appropriate gamma band at least in part by determining a luminance level of surrounding pixels. In some embodiments, determining the respective gray-scale values for the plurality of pixels is performed in parallel. In some embodiments, determining the respective gray-scale values for the plurality of pixels is performed serially.

The system 100 adjusts (410) the luminance level of each pixel according to the respective selected gamma band. In some instances, the system 100 does not adjust the gamma band for some pixels.

The system 100 displays (412) the pixels according to the adjusted luminance levels. In some embodiments, a first pixel of the plurality of pixels has an adjusted luminance level that is greater than the luminance of the initial color value for the first pixel. In some embodiments, a first pixel of the plurality of pixels has an adjusted luminance level that is less than the luminance of the initial color value for the first pixel.

In some embodiments, the system 100 performs the steps of method 400 of generating, determining, selecting, adjusting, and displaying, at a repetitive designated time frequency (e.g., 30 times per second). In some embodiments when the display has a plurality of distinct backlight split zones, the system generates, determines, selects, adjusts, and displays the pixels separately for each backlight split zone.

In some embodiments, the method 400 is performed at a display 102 by utilizing display driver integrated circuits to perform the generating, determining, selecting, adjusting, and displaying.

Figure 5:
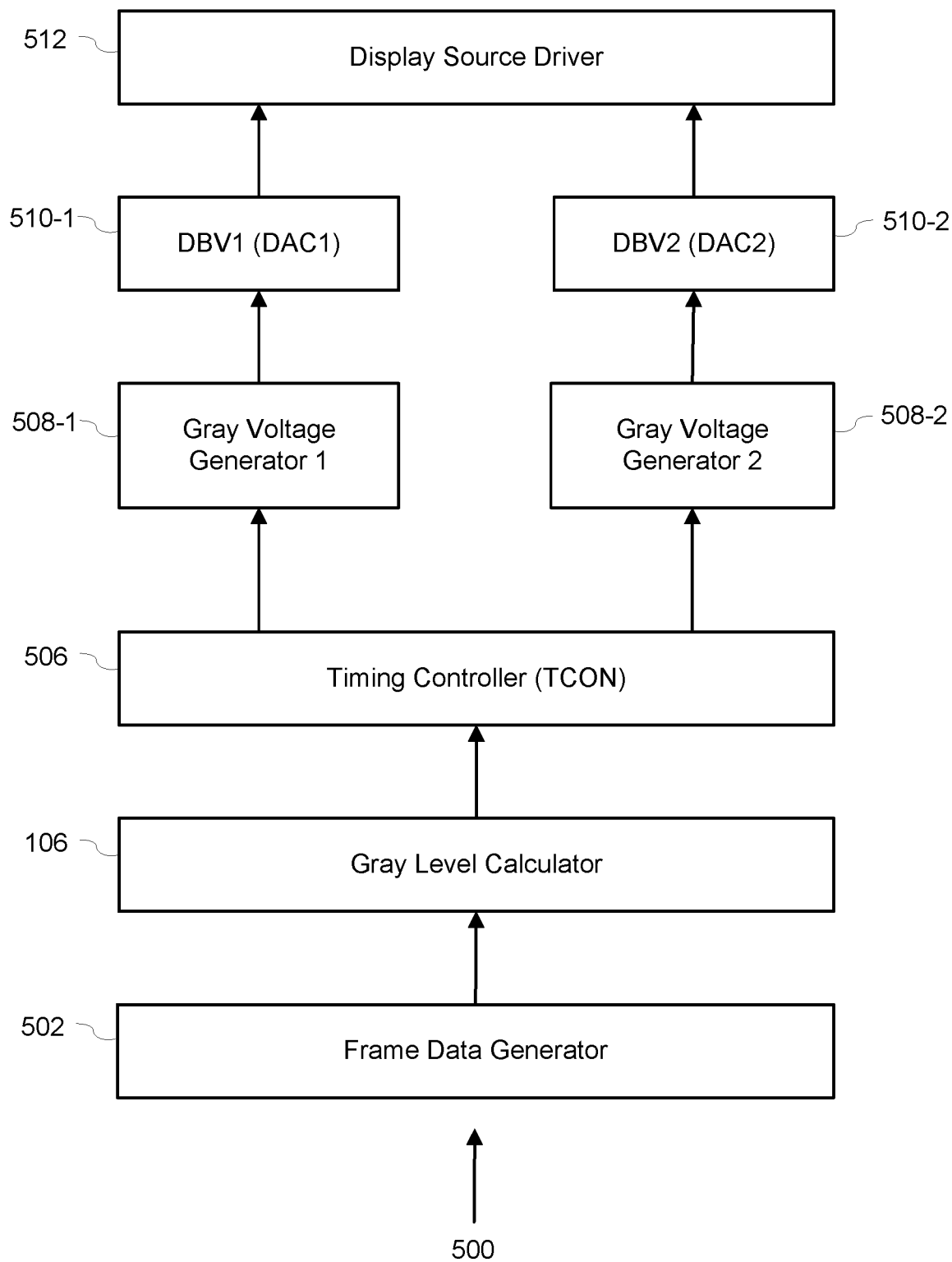
FIG. 5 is a flow diagram for utilizing multiple gamma bands for a head-mounted display in accordance with some embodiments.

FIG. 5 is a flow diagram for utilizing multiple gamma bands for a head-mounted display in accordance with some embodiments.

The initial video input is generated by a frame data generator 502. The generator creates color data (e.g., RGB) for each of the pixels of the display 101. For each of the pixels, the gray-level calculation module 106 computes a gray level. The gray level is typically computed as a linear combination of the R, G, and B color components. The color components are typically not weighted equally because human perception of gray level is different for each of the colors.

Using the gray levels computed for each of the pixels, the timing controller 506 assigns each of the pixels to one of the gamma bands. The goal is to make dark pixels darker and light pixels lighter. The timing controller may determine the specific gamma band assigned to each pixel. In some embodiments, a separate component may define which pixel will utilize specific gamma bands.

In some implementations, computing the gamma band for each pixel uses the following process. Consider a pixel at (50, 100) with a computed gray level value of 200. Using the input video gamma $\gamma_0$, compute the default luminance $L_0 = a \cdot 200^{\gamma_0}$. In this case, suppose the default luminance is 30. Suppose there are four gamma bands with luminance targets 10, 40, 80, and 100. Select the luminance target that is closest to the default luminance, which is 40 in this example. Then assign the pixel to the gamma band with this luminance target. After the gamma band is selected, convert to the new gray level based on selected gamma band and apply it to the pixel.

The example in FIG. 5 has just two gamma bands, one corresponding to the left path in FIG. 5 and the second gamma band corresponding to the right path in FIG. 5. The gray voltage generators have an initial gray voltage without any gamma band selections. In some embodiments, different voltage levels are applied by the gray voltage generators to change the gamma bands. The output from the gray voltage generators 508 is processed by the digital to analog converters (DACs) 510 to generate an analog signal for each pixel. The display source drivers 512 then amplifies the analog signals for the display device.

Figure 6:
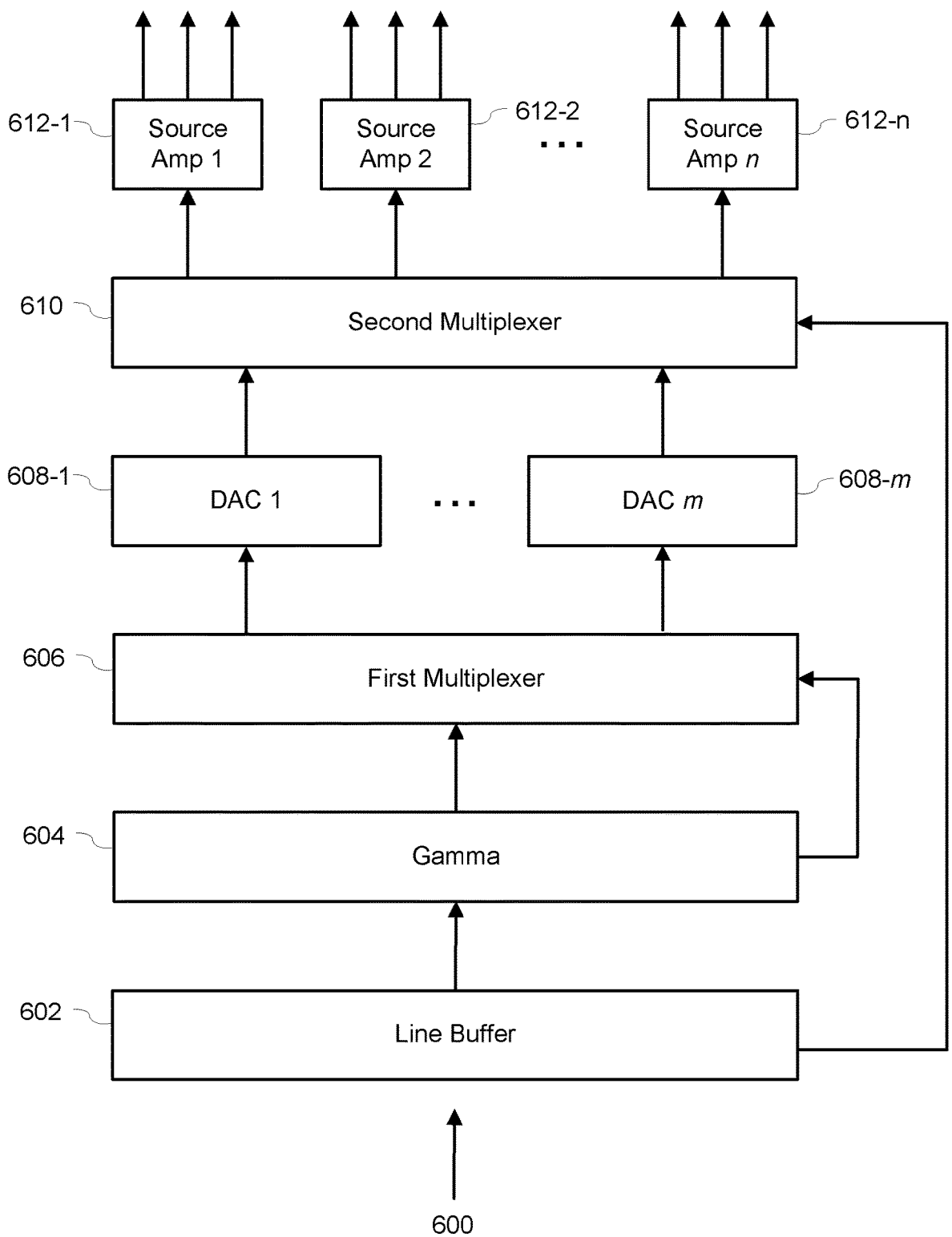
FIG. 6 is a flow diagram for utilizing multiple gamma bands for a head-mounted display with segmented source drivers in accordance with some embodiments.

FIG. 6 is a flow diagram for utilizing multiple gamma bands for a head-mounted display with segmented source drivers in accordance with some embodiments.

The line buffer 602 processes one or more rows/columns of the pixels of the display in a FIFO pipeline architecture. The line buffer 602 is similar to the frame data generator 502 in FIG. 5. However, the line buffer 602 has a limited predefined number of lines, allowing the device to save memory. The data from the line buffer 602 is passed to the gamma block 604, which translates the input information from a high bit depth to a lower bit depth. For example, the input can be a 10 bit depth gamma and the gamma block decodes the input to an 8 bit depth gamma plus selection number for a digital analog converter (DAC). The DAC selection number information is then fed into a first multiplexer 606.

The first multiplexer 606 selects which DAC to use based on the values received from the gamma block 604. Each DAC 608 corresponds to a distinct gamma band. The second multiplexer 610 selects which part of the screen or display to update first. Each source amplifier 612 corresponds to a specific segment of the display 102. The first and second multiplexers are used to allow flexible optimization of the image updating sequence.

In summary, each pixel is assigned to a specific gamma band, and each pixel corresponds to a specific region of the screen. The pixel is first split among the DACs so that each pixel get the appropriate voltage gain (or drop) according to the selected gamma band. The pixel data is then split into the display regions, with each region corresponding to one of the source amplifiers. The first multiplexer handles the splitting according to gamma bands, and the second multiplexer handles splitting according to the display regions.

Although some of various drawings illustrate a number of logical stages/steps in a particular order, stages which are not order dependent may be reordered and other stages may be combined or broken out. While some reordering or other groupings are specifically mentioned, others will be apparent to those of ordinary skill in the art, so the ordering and groupings presented herein are not an exhaustive list of alternatives. Moreover, it should be recognized that the stages could be implemented in hardware, firmware, software, or any combination thereof.

The foregoing description, for purpose of explanation, has been described with reference to specific embodiments. However, the illustrative discussions above are not intended to be exhaustive or to limit the scope of the claims to the precise forms disclosed. Many modifications and variations are possible in view of the above teachings. The embodiments were chosen in order to explain the principles underlying the claims and their practical applications, to thereby enable others skilled in the art to best use the embodiments with various modifications as suited to the particular uses contemplated.

What is claimed is:

1. A method, comprising:
   at a virtual-reality device having a data generator, one or more processors, two or more gamma bands, and a display comprising a plurality of pixels;
   for each pixel of the plurality of pixels:
      generating an initial color value;
      determining a respective gray-level value according to the generated color value;
      generating one or more contextual markers based on luminance levels of one or more pixels surrounding the respective pixel;
      selecting a respective gamma band corresponding to the determined respective gray-level value and the one or more contextual markers, wherein each gamma band has a distinct luminance target;
      adjusting a respective luminance level of the respective pixel according to the respective selected gamma band; and
   displaying the plurality of pixels according to the adjusted luminance levels.

2. The method of claim 1, wherein determining the respective gray-level value for each of the plurality of pixels is performed in parallel.

3. The method of claim 1, wherein determining the respective gray-level value for each of the plurality of pixels is performed serially.

4. The method of claim 1, wherein the one or more contextual markers for a first pixel, of the plurality of pixels, include the color values for pixels adjacent to the first pixel.

5. The method of claim 1, wherein a first pixel of the plurality of pixels has an adjusted luminance level that is greater than a luminance of the initial color values for the first pixel.

6. The method of claim 1, wherein a first pixel of the plurality of pixels has an adjusted luminance level that is less than a luminance of the initial color values for the first pixel.

7. The method of claim 1, wherein the generating, determining, generating, selecting, adjusting, and displaying are repeated at a designated time frequency.

8. The method of claim 7, wherein the designated time frequency is 30 times per second.

9. The method of claim 1, wherein the display has a plurality of distinct backlight split zones, and the generating an initial color value, determining, generating one or more contextual markers, selecting, adjusting, and displaying are applied separately for each backlight split zone.

10. The method of claim 1, wherein selecting the respective gamma band for a first pixel of the plurality of pixels includes determining a location of the first pixel within the display.

11. A virtual-reality device comprising:
   a display comprising a plurality of pixels;
   one or more processors;
   non-transitory memory; and
   one or more programs stored in the non-transitory memory and configured to be executed by the one or more processors, the one or more programs including instructions for:
   for each pixel of the plurality of pixels:
      generating an initial color value;

determining a respective gray-level value according to the generated color value;

generating one or more contextual markers based on luminance levels of one or more pixels surrounding the respective pixel;

selecting a respective gamma band corresponding to the determined respective gray-level value and the one or more contextual markers, wherein each gamma band has a distinct luminance target;

adjusting a respective luminance level of the respective pixel according to the respective selected gamma band; and displaying the plurality of pixels according to the adjusted luminance levels.

12. The device of claim 11, wherein the one or more contextual markers for a first pixel of the plurality of pixels include the color values for pixels adjacent to the first pixel.

13. The device of claim 11, wherein a first pixel of the plurality of pixels has an adjusted luminance level that is greater than a luminance of the initial color values for the first pixel.

14. The device of claim 11, wherein a first pixel of the plurality of pixels has an adjusted luminance level that is less than a luminance of the initial color values for the first pixel.

15. The device of claim 11, wherein the generating, determining, generating, selecting, adjusting, and displaying are repeated at a designated time frequency.

16. The device of claim 11, wherein the display has a plurality of distinct backlight split zones, and the generating an initial color value, determining, generating one or more contextual markers, selecting, adjusting, and displaying are applied separately for each backlight split zone.

17. The device of claim 11, wherein selecting the respective gamma band for a first pixel of the plurality of pixels includes determining a location of the first pixel within the display.

18. A non-transitory computer-readable storage medium, storing one or more programs configured for execution by one or more processors of a virtual-reality device having a display with a plurality of pixels, the one or more programs including instructions for:

for each pixel of the plurality of pixels:

generating an initial color value;

determining a respective gray-level value according to the generated color value generating one or more contextual markers based on luminance levels of one or more pixels surrounding the respective pixel;

selecting a respective gamma band corresponding to the determined respective gray-level value and the one or more contextual markers, wherein each gamma band has a distinct luminance target;

adjusting a respective luminance level of the respective pixel according to the respective selected gamma band; and displaying the plurality of pixels according to the adjusted luminance levels.

\* \* \* \* \*